March 10, 1953 L. R. PARKER 2,630,650
RETRIEVING SINKER FOR FISHING LINES
Filed Nov. 13, 1951

Lew R. Parker
INVENTOR.

BY

/ Patented Mar. 10, 1953

2,630,650

UNITED STATES PATENT OFFICE 2,630,650

RETRIEVING SINKER FOR FISHING LINES

Lew R. Parker, Victorville, Calif.

Application November 13, 1951, Serial No. 255,929

1 Claim. (Cl. 43—44.97)

This invention relates to new and useful improvements and structural refinements in retrieving sinkers for fishing lines, and the principal object of the invention is to function as a sinker and to facilitate convenient and expeditious dislodging of fish hooks when they tend to become caught between rocks or other submerged obstructions.

An important feature of the invention resides in the provision of means for dislodging a fish hook by a simple tugging action on the fishing line, the sinker having an oblique surface which offers resistance to water in such manner as to cause the device and the associated fishing line to be drawn upwardly rather than laterally when tugging action is applied thereto.

Some of the advantages of the invention reside in its simplicity of construction, in its efficient and dependable operation and in its adaptability to economical manufacture.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
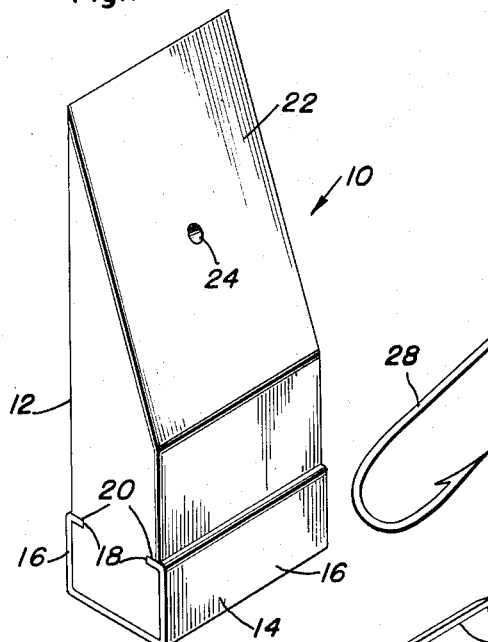
Figure 1 is a perspective view of the invention.
Figure 2:
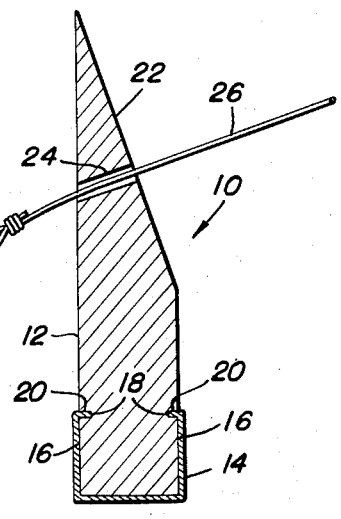
Figure 2 is a vertical sectional view illustrating the invention applied to a fishing line.
Figure 3:
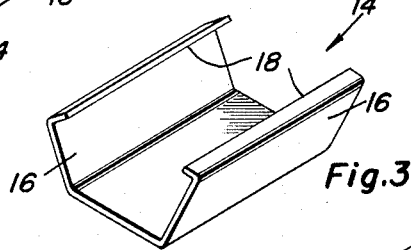
Figure 3 is a perspective view of the ballast member used in the invention.

Referring now to the accompanying drawings in detail, the invention consists of a retrieving sinker which is designated generally by the reference character 10 and embodies in its construction a vertically elongated body 12 which may be formed from any suitable material, preferably buoyant material. A ballast member 14 is applied to the lower portion of the body so that the body tends to sustain an upright position when submerged in water. The ballast member 14 may be of any suitable form, preferably in the nature of a metallic channel having bendable side portions 16 provided with inturned flanges 18, the lower portion of the body 12 being provided in the front and rear surfaces thereof with transverse grooves 20 to receive the flanges when the ballast member is applied to the body and the side portions 16 are pressed inwardly, as shown.

The upper portion of the body 12 is provided with an upwardly inclined, flat front surface 22 and with a transverse bore 24 which is preferably perpendicular to the surface 22. The bore 24 is adapted to slidably receive therein the fishing line or leader 26, as shown.

Figure 4:
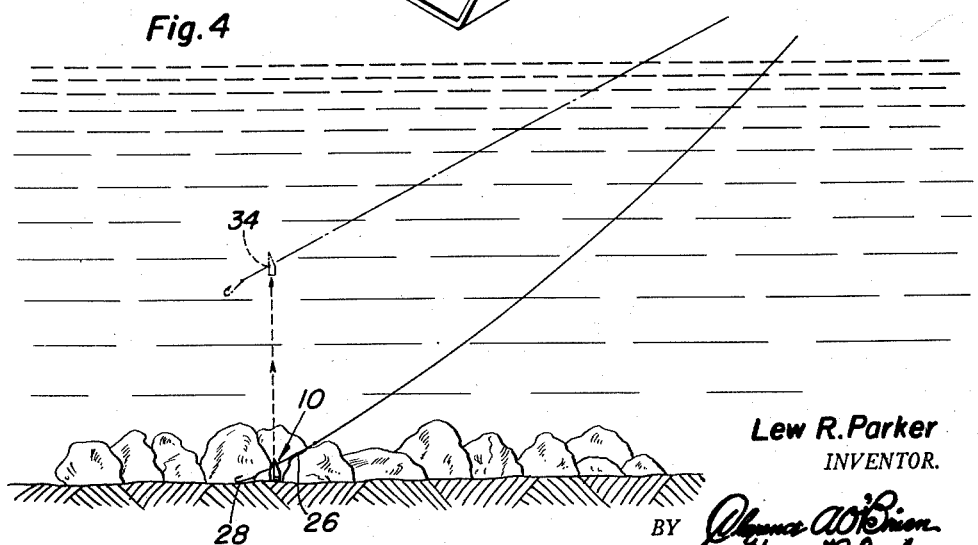
Figure 4 is an elevational view showing the invention in use under water.

If the hook 28 of the fishing line 26 should tend to become entangled with submerged rocks or the like, as indicated in Figure 4, buoyancy of the body 12 will sustain the device in a substantially upright position, and when tugging action is exerted on the line 26, pressure of water against the flat, inclined surface 22 of the body 12 will cause the entire device to rise upwardly as indicated at 30 in Figure 4, thus dislodging the hook.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

A retrieving sinker for fishing lines, comprising a vertically elongated block of buoyant material, said block including a flat bottom, a flat vertical rear wall, and a front wall having a flat vertical lower portion and a flat upper portion extending obliquely from the upper edge of the lower portion to the upper edge of the rear wall, the upper portion of the block being provided with an open-ended cylindrical bore having its axis at right angles to the upper front wall portion and adapted to slidably receive a fishing line, the lower portion of the block being provided in the front and rear walls thereof with a pair of transverse grooves, and an open-ended channel shaped ballast member of bendable metallic material embracing the lower portion of the block, said member affording a bottom and side portions abutting the corresponding bottom and front and rear wall portions of the block, and a pair of inturned flanges provided at the upper edges of the side portions of said member, said flanges being disposed in said grooves, whereby to secure the member to said block.

LEW R. PARKER.

(References on following page)

REFERENCES CITED

The following references are of record in the file of this patent:

UNITED STATES PATENTS

| Number | Name | Date |
|---|---|---|
| 1,394,313 | Leeper | Oct. 18, 1921 |
| 1,489,043 | Reinewald | Apr. 1, 1924 |
| 1,499,975 | Ford | July 1, 1924 |
| 2,184,589 | Griffith | Dec. 26, 1939 |
| 2,502,944 | Gross | Apr. 4, 1950 |

FOREIGN PATENTS

| Number | Country | Date |
|---|---|---|
| 307,685 | Great Britain | Mar. 14, 1929 |